United States Patent
Welch et al.

(10) Patent No.: US 7,514,057 B2
(45) Date of Patent: Apr. 7, 2009

(54) PROCESS FOR SELECTIVE OXIDATION OF CARBON MONOXIDE IN A HYDROGEN CONTAINING STREAM

(75) Inventors: M. Bruce Welch, Bartlesville, OK (US); Roland Schmidt, Bartlesville, OK (US); Jianhua Yao, Bartlesville, OK (US); Glenn W. Dodwell, Bartlesville, OK (US); Robert W. Morton, Bartlesville, OK (US); Jason J. Gislason, Bartlesville, OK (US); James B. Kimble, Bartlesville, OK (US); David E. Simon, Bartlesville, OK (US); Marvin M. Johnson, Bartlesville, OK (US)

(73) Assignee: Conoco Phillips Company, Houston, TX (US)

( * ) Notice: Subject to any disclaimer, the term of this patent is extended or adjusted under 35 U.S.C. 154(b) by 0 days.

(21) Appl. No.: 12/195,105

(22) Filed: Aug. 20, 2008

(65) Prior Publication Data

US 2008/0305023 A1   Dec. 11, 2008

Related U.S. Application Data

(62) Division of application No. 11/458,149, filed on Jul. 18, 2006, now Pat. No. 7,439,206.

(51) Int. Cl.
*C01B 31/18* (2006.01)
*C10K 1/00* (2006.01)

(52) U.S. Cl. ..................... 423/247; 423/415.1

(58) Field of Classification Search .......... 423/247, 423/415.1
See application file for complete search history.

(56) References Cited

U.S. PATENT DOCUMENTS

| | | | |
|---|---|---|---|
| 3,760,029 A | 9/1973 | McCoy | |
| 3,897,368 A | 7/1975 | Ohara et al. | |
| 3,965,040 A | 6/1976 | Kobylinski et al. | |
| 4,048,058 A | 9/1977 | Peterson et al. | |
| 4,366,668 A | 1/1983 | Madgavkar et al. | |
| 4,378,048 A | 3/1983 | Madgavkar et al. | |
| 4,407,738 A | 10/1983 | Eskinazi et al. | |
| 4,644,090 A | 2/1987 | Johnson | |
| 4,808,394 A | 2/1989 | Kolts et al. | |
| 4,920,088 A | 4/1990 | Kolts | |
| 5,017,357 A | 5/1991 | Kolts et al. | |
| 5,151,401 A | 9/1992 | Schubert et al. | |
| 5,286,698 A | 2/1994 | Carberry et al. | |
| 5,733,518 A | 3/1998 | Durante et al. | |
| 5,851,948 A | 12/1998 | Chuang et al. | |
| 6,093,670 A | 7/2000 | Brown | |
| 6,274,107 B1 | 8/2001 | Yavuz et al. | |
| 6,344,174 B1 | 2/2002 | Miller et al. | |
| 6,428,761 B1 | 8/2002 | Shore et al. | |
| 6,541,419 B2 | 4/2003 | Shore et al. | |
| 2002/0041842 A1 | 4/2002 | Ruettinger et al. | |

FOREIGN PATENT DOCUMENTS

WO   WO0147806   7/2001

*Primary Examiner*—Elizabeth D Wood

(57) ABSTRACT

A method of making a composition, said method comprising, spraying a substance comprising platinum and iron into or onto an alumina-containing compound is disclosed. The resulting composition can then be used in a process for oxidizing carbon monoxide with free oxygen.

7 Claims, No Drawings

PROCESS FOR SELECTIVE OXIDATION OF CARBON MONOXIDE IN A HYDROGEN CONTAINING STREAM

This application is a division of application Ser. No. 11/458,149, filed Jul. 18, 2006, U.S. Pat. No. 7,439,206.

FIELD OF THE INVENTION

The invention relates to the catalytic oxidation of carbon monoxide. In another of its aspects the invention relates to the selective oxidation of carbon monoxide in the presence of hydrogen. In yet another aspect the invention relates to removing as much carbon monoxide as possible, preferably all carbon monoxide, from a stream containing carbon monoxide and hydrogen, particularly, to provide hydrogen feedstock for fuel cells.

BACKGROUND OF THE INVENTION

The selective oxidation of carbon monoxide in hydrogen-rich streams has been of considerable technical interest for the purification of reformed hydrogen used in feed gas in ammonia synthesis. Recently, this selective oxidation process, sometimes referred to as preferential oxidation, has attracted interest due to the possibility of using this technology in providing suitable hydrogen fuel for fuel cells. Since carbon monoxide is also oxidized to provide carbon dioxide for carbon dioxide lasers, the use of a catalytic composition, which previously had been found useful in the oxidation of carbon monoxide for use in carbon dioxide lasers, has also been investigated for adaptation for use in providing carbon monoxide-free hydrogen for fuel cell feedstock.

A fuel cell is an electrochemical device that enables converting the chemical energy of fuels directly to electricity. A hydrogen-air polymer electrolyte membrane (PEM) fuel cell stack is currently considered the best means for adapting this technology to most uses. The PEM fuel cell is most efficient using gaseous hydrogen for fuel. Use of a fuel processor to generate a hydrogen-rich feedstock at the point of use eliminates problems of storage and distribution of the hydrogen fuel.

A fuel processor can convert fuels such as alcohol, gasoline, liquid petroleum gas, or natural gas to a hydrogen-rich stream. By a process of steam reforming a stream consisting primarily of hydrogen, carbon dioxide and carbon monoxide can be produced, but the product is generally saturated with water. Processing this stream in a shift reactor reduces the carbon monoxide content to provide relatively more hydrogen by means of the well-known water-gas-shift reaction. This reaction provides a product that contains from 0.2 to 2 percent carbon monoxide by volume, which is still sufficient to poison the platinum-based catalytic composition at the PEM anode.

SUMMARY OF THE INVENTION

It is an object of this invention to provide a process that is effective for catalytically oxidizing carbon monoxide with oxygen.

It is a further object of this invention to provide a novel method of making a catalytic composition.

In accordance with the present invention, a method is provided for preparing a composition. This method comprises, consists of, or consists essentially of the steps of:

a) incorporating a hydrocarbon into the pores of an alumina-containing compound such that at least half of the pore volume of said alumina-containing compound contains said hydrocarbon;

b) spraying a substance comprising platinum and iron into or onto said alumina-containing compound to form a sprayed support;

c) contacting said sprayed support with a sulfide selected from the group consisting of hydrogen sulfide and an alkyl-sulfide to form a sulfided support;

d) calcining said sulfided support to form a calcined support;

e) contacting said calcined support with steam to form a steamed support; and f) reducing said steamed support to form said composition.

In accordance with the second embodiment, this invention a process is provided for the selective oxidation of carbon monoxide to carbon dioxide in a gaseous mixture comprising hydrogen and carbon monoxide. The process comprises, consists of, or consists essentially of:

contacting a feed stream comprising carbon monoxide, hydrogen and oxygen with a composition prepared by the method of the first embodiment in a contacting zone under contacting conditions for a period to produce a product stream comprising less carbon monoxide than the feed stream.

Other objects and advantages of the present invention will become apparent from consideration of the specification and appended claims.

DETAILED DESCRIPTION OF THE INVENTION

In accordance with the first embodiment of this invention, a method for preparing a composition comprises, consists of, or consists essentially of:

a) incorporating a hydrocarbon into the pores of an alumina-containing compound such that at least half of the pore volume of said alumina-containing compound contains said hydrocarbon;

b) spraying a substance comprising platinum and iron into or onto said alumina-containing compound to form a sprayed support;

c) contacting said sprayed support with a sulfide selected from the group consisting of hydrogen sulfide and an alkyl-sulfide to form a sulfided support;

d) calcining said sulfided support to form a calcined support;

e) contacting said calcined support with steam to form a steamed support; and f) reducing said steamed support to form said composition.

The preparation of the composition useful in this invention can be carried out by the following method:

The first step in this method involves incorporating a hydrocarbon into the pores of an alumina-containing compound such that at least half of the pore volume of the alumina-containing compound contains the hydrocarbon.

Any suitable hydrocarbon can be used for the incorporation. Preferably, pentane is used since it can be easily vaporized. Preferably, about 50% to about 100% of the pore volume is filled with the hydrocarbon.

After the incorporating step, a substance comprising platinum and iron is then sprayed into or onto the alumina-containing compound. Preferably, the substance is comprised of chloroplatinic acid and ferric chloride.

The incorporation and the spraying steps can also be repeated to achieve the desired effect.

The resulting sprayed support is then contacted with a sulfide selected from the group consisting of hydrogen sulfide and an alkyl sulfide to form a sulfided support. If an alkyl sulfide is used, preferably it is dimethyl sulfide.

The support is preferably sulfided at a temperature in the range of from about room temperature to about 500° C. After the sulfiding, the support is preferably flushed with air.

The sulfided support is then calcined. Preferably, the sulfided support is calcined at a temperature in the range of from about 150° C. to about 700° C.

The calcined support is then contacted with steam to form a steamed support. Preferably, the calcined support is steamed by contacting it with water saturated air at a temperature in the range of from about 150° C. to about 700° C. The support can be steamed during the calcination step described above, during the reduction step as described below, or in between the calcination and reduction steps.

The reduction step can be carried out in any suitable manner, preferably at a temperature of about 20° C. to about 650° C., more preferably at about 200° C. to about 500° C. for about 0.5 hour to about 20 hours, preferably about 1 hour to about 5 hours to enhance the activity of the catalyst composition for catalyzing a low temperature oxidation of CO with $O_2$ in the presence of hydrogen. Any reducing gas can be used: hydrogen, CO, paraffins and the like and mixture thereof. This reduction step leaves at least a portion of the platinum of the composition in a reduced valence state. The composition can also undergo treatment with steam during the reduction step.

The composition is then recovered.

According to the second embodiment of this invention the process for oxidizing carbon monoxide in a feed stream that also contains hydrogen and oxygen comprises:

contacting a feed stream comprising carbon monoxide, hydrogen and oxygen with a composition prepared in the first embodiment in a contacting zone under contacting conditions for a period to produce a product stream comprising less carbon monoxide than the feed stream.

The feed stream to the oxidation process can be formed in any suitable manner, such as by mixing the hydrogen that contains carbon monoxide contaminant with the oxygen containing air at any point before or at a point of contact with the composition.

The process for oxidizing a feed containing carbon monoxide and hydrogen gas can be carried out at any temperature and pressure conditions, for any length of time, any gas hourly space velocity and any volume ratio of $O_2$ to CO that is suitable for selective oxidation of CO in the presence of hydrogen. Generally, the temperature of this process is in a range of about 60° C. to about 100° C., preferably in a range of about 65° C. to about 90° C., and most preferably in a range of 70° C. to 85° C.

The pressure during the oxidation process generally is in the range of about 10 psia to about 1000 psia, preferably 14 psia to 200 psia.

The ratio of moles of $O_2$ in the feed gas to the moles of CO in the feed gas will generally be in the range of about 0.5 to 8.0 mol $O_2$/mol CO, preferably 0.5 to 4.0 mol $O_2$/mol CO, most preferably 0.5 to 1.5 mol $O_2$/mol CO.

The gas hourly space velocity (cc feed gas per cc catalyst per hour) can be in the range of about 100 to about 200,000, preferably from about 5,000 to about 50,000.

The hydrogen will generally be in the range of about 50-90 volume percent and the inlet CO will generally be in the range of about 0.1 to about 5 volume percent.

The following examples are presented in further illustration of the invention and are not to be construed as limiting the scope of the invention.

EXAMPLES

Example I

Control

A 2.90-gram quantity of chloroplatinic acid and a 3.22-gram quantity of ferric chloride were dissolved in 40 mL water. Half of this solution was then incorporated onto 50 grams of calcined alumina and was then dried at 120° C. for 1.5 hours and calcined at 250° C. for 4 hours.

A 2-gram quantity of the composition prepared above was then charged to a ½-inch diameter stainless steel reactor and was reduced for 2 hours at a temperature of 300° C. with a hydrogen flow of 300 cc/min. After the reduction, the reactor was cooled to room temperature.

A flow of gas was then charged to the reactor. The gas comprised the following: 76.3% $H_2$, 1.0% CO, 19.2% $CO_2$ and 3.5% air. The flow rate was 518 cc/min, the temperature was 80° C. and the pressure was atmospheric pressure. The reaction was run for about 3 hours.

The results are shown in Table I (below).

Example II

Two grams of the composition prepared in Example I were charged to a ½-inch stainless steel reactor. The composition was then reduced at 300° C. for 2 hours with hydrogen flowing through a water bubbler at 300 cc/min. After the reduction, the reactor was cooled to room temperature. Then, a flow of gas was charged to the reactor that had a composition and temperature and pressure conditions the same as in Example I. The reaction was run for about 4 hours.

The results are shown in Table I (below).

Example III

A 2.90-gram quantity of chloroplatinic acid and a 3.22-gram quantity of ferric chloride were dissolved in 40 mL of water. Half of the solution was incorporated onto 50 grams of calcined alumina and was then dried at 120° C. for 1.5 hours. A 25-gram quantity of the composition was then charged to a tube where it was calcined at 250° C. with both air and steam for 4 hours.

Two grams of this calcined and steamed composition were charged to a ½-inch diameter stainless steel tube reactor. The composition was reduced at a temperature of 300° C. for two hours with a hydrogen flow of 300 cc/min. Then, a flow of gas was charged to the reactor that had composition the same as in Example I and the reaction was run at the conditions disclosed in Example I. The reaction was run for about 4 hours.

The results are shown in Table I (below).

TABLE I

| Example | Description | CO Conversion (%) |
|---------|-------------|-------------------|
| I | Control | 87.2 |
| II | Steamed during reduction | 94.8 |
| III | Steamed during calcination | 92.9 |

The results from the first three Examples show that it can be beneficial to steam these catalyst compositions.

Example IV

A 1.06-gram quantity of chloroplatinic acid and a 0.20-gram quantity of ferric chloride was added to 20 mL of acetone. This was then sprayed onto 20 grams of calcined alumina. This was dried at 120° C. over night. Then, 10 grams of the composition prepared above was steamed in air at 250° C. for 4 hours.

Two grams of the composition prepared above were then placed in a ½-inch diameter stainless steel tube reactor. The composition was reduced for 2 hours with a hydrogen flow.

A flow of gas was then charged to the reactor at a rate of 530 cc/min. The gas flow comprised: 74.4% $H_2$, 94% CO, 18.8% $CO_2$, 3.4% air and 2.4% $H_2O$. The reaction temperature was 60° C. and the pressure was atmospheric.

The results are shown in Table II (below).

TABLE II

Example IV Composition

| Time on Stream (hrs) | CO Conversion (%) |
|---|---|
| 3 | 94.79 |
| 25 | 93.12 |
| 45 | 94.76 |
| 69 | 93.5 |
| 141 | 92.32 |
| 164 | 89.68 |

Example V

A 2.24-gram quantity of chloroplatinic acid and a 0.64-gram quantity of ferric chloride were dissolved in 30 mL of acetone. This solution was sprayed onto 40 grams of calcined alumina.

A 20-gram quantity of the composition prepared above was placed in a quartz tube. A 200 cc/min. flow of nitrogen was first charged to a bubbler with a quantity of dimethyl sulfide (which was set in a 27° C. water bath) and was then charged to the quartz tube. The temperature of the quartz tube was increased to 350° C. and remained at that temperature for about 20 minutes. The composition was then steamed in an air flow through a water bubbler for 2.5 hours at 350° C.

Two grams of the composition prepared above was then placed in a ½-inch diameter stainless steel tube reactor. The composition was then reduced with a flow of hydrogen.

A flow of gas was then charged to the reactor. The gas comprised: 395 cc/min $H_2$, 5 cc/min CO, 100 cc/min $CO_2$, and 18 cc/min air, and also water vapor. The reaction temperature was 60° C. The results are shown in Table III (below).

TABLE III

Example V Composition

| Time on Stream (hrs) | CO Conversion (%) |
|---|---|
| 22 | 97.33 |
| 46 | 97.08 |
| 70 | 95.92 |
| 142 | 93.74 |
| 166 | 92.71 |
| 186 | 92.28 |

Example VI

A solution containing 50 grams of $H_2PtCl_6$, 14.3 grams $FeCl_3.6H_2O$, and 660 mL acetone was sprayed onto 892 grams of calcined alumina. A 300 gram quantity of the above-prepared material was then treated with hydrogen sulfide for 15 minutes and subsequently was treated with air for one hour. The composition was then preheated at a temperature of 325° C. and was then treated with steam for 4 hours and 40 minutes.

A two gram quantity of the above-prepared composition was charged to a stainless steel reactor. The composition was reduced at 300° C. for one hour with a hydrogen flow at 300 cc/min through a water bubbler.

A flow of gas was then charged to the reactor. The gas comprised: 15 cc/min CO, 385 cc/min $H_2$, 101 cc/min $CO_2$ and 18 cc/min air. The reaction temperature was 60° C. At a time of 16.5 hours on-stream, the reaction yielded a CO conversion of 91.8%.

Example VII

A solution was made, comprising 50 grams of $H_2PtCl_6$, 14.3 grams of $FeCl_3.6H_2O$, and 500 mL of acetone. First, 300 mL of pentane was sprayed onto 892 grams of calcined alumina. Then 125 mL of the above solution was sprayed onto the alumina. The alumina was then dried for 20 minutes. The above three steps were repeated three times. A 50 gram quantity of the composition prepared above was loaded into a quartz tube and flushed with hydrogen sulfide for ten minutes at room temperature. The composition was then flushed with air for one hour at room temperature. The composition was then heated to 350° C. and steamed for 4 hours.

A 2 gram quantity of the above-prepared composition was charged to a ½ inch stainless steel reactor. The composition was reduced at a temperature of 300° C. under a flow of hydrogen at a rate of 300 cc/min through a water bubbler for one hour. The flow of gas was then charged to the reactor. The gas comprised 15 cc/min carbon monoxide, 385 cc/min hydrogen, 18 cc/min $CO_2$, and 100 cc/min air. The reaction temperature was 62° C. After 16 hours on-stream, the CO conversion rate was 98.0%. A subsequent run yielded a CO conversion rate of 99.2% after 20.0 hours on-stream.

Example VIII

An 8.06 gram quantity of bis(acetylacetonate)Platinum(II) and a 10.12 gram quantity of ferric acetylacetonate were added to a container and then about 600 mL acetone is then added and the solids are dissolved. This solution is then sprayed onto 400 grams of calcined alumina. The composition was dried at 150° C. for 1.5 hours and calcined at 400° C. in air for 3 hours. The composition is then placed into a 2 inch calcination tube and was purged with nitrogen at 300° C. The composition is then reduced in flowing hydrogen at 300° C. for 3 hours and then was cooled to room temperature while being purged with nitrogen. The composition was then treated with nitric acid, dried at 150° C. for 1.5 hours and calcined at 400° C. in air for three hours.

A 2 gram quantity of the composition prepared above was placed in a reactor. The temperature was set at 60° C. A flow of gas was then charged to the reactor. The gas flow comprised: 5 ml/min CO, 100 ml/min $CO_2$, 395 ml/min $H_2$, 18 ml/min air and also water vapor.

TABLE IV

Example VIII Composition

| Time on Stream (hrs) | CO Conversion (%) |
|---|---|
| 4 | 98.49 |
| 76 | 96.35 |
| 100 | 96.37 |
| 102.5 | 95.77 |
| 121 | 95.11 |
| 145 | 94.86 |
| 170 | 93.44 |
| 241 | 91.94 |
| 266 | 90.68 |
| 289.5 | 91.78 |
| 294.5 | 90.11 |
| 313 | 90.32 |
| 315 | 89.2 |
| 337 | 89.51 |
| 342.5 | 88.87 |

Example IX

A 300 ml quantity of pentane was sprayed onto calcined alumina. Then, a solution of 50 grams $H_2PtCl_6.6H_2O$ and 14.3 grams $FeCl_3 6H_2O$ in 500 ml acetone is sprayed onto the alumina in a series of several applications. Between each of the acetone applications and after the final application, the composition is dried by blowing air through the spheres to constant weight. Prior to each acetone application, a 300 ml quantity of pentane is sprayed onto the spheres.

The catalyst is then treated with $H_2S$ at room temperature.

A 300 gram quantity of the catalyst was treated in a 3.5 inch tube at a flow velocity of 150 ml/min. for 15 minutes. The catalyst was then flushed with air for one hour. A furnace was then preheated to 320° C. and a 3.5 inch tube containing 300 grams of the $H_2S$-treated catalyst is then steamed by passing 1.5 L/min. of water-saturated air at 82° C. through it. The water vapor treatment is continued for 4 hours at 310-320° C.

A 150 gram quantity of the steamed catalyst is added to a 2 inch tube. Water-saturated hydrogen is contacted with the catalyst at 3.5 L/min. The temperature is increased at 3° C. per minute to 270° C. and held at this temperature for 6 hours. The temperature is then increased to 290° C. at 3° C. per minute and held for 1 hour. The heater was then turned off and the temperature was reduced to about 30° C. under a hydrogen flow. The catalyst was then flushed with nitrogen for ten minutes.

A 2 gram quantity of the catalyst prepared above was placed in a reactor. The temperature was set at 60° C. A flow of gas was then charged to the reactor. The gas flow comprised: 5 ml/min. CO, 100 ml/min. $CO_2$, 395 ml/min. $H_2$, 18 ml/min. air and also water vapor.

TABLE V

Example IX Composition

| Time on Stream (hrs) | CO Conversion (%) |
|---|---|
| 2.5 | 99.82 |
| 94.5 | 99.02 |
| 122 | 98.75 |
| 142 | 98.03 |
| 170 | 97.72 |
| 194 | 97.26 |
| 267 | 94.66 |
| 291.5 | 94.87 |
| 315.5 | 93.26 |
| 335 | 93.86 |
| 357.5 | 92.24 |

While this invention has been described in terms of the presently preferred embodiments, reasonable variations and modifications are possible by those skilled in the art. Such variations and modifications are within the scope of the described invention and the appended claims.

That which is claimed:

1. A process for oxidizing carbon monoxide with free oxygen to carbon dioxide comprises:
   contacting a feed stream comprising carbon monoxide, hydrogen, and oxygen with a composition in a contacting zone under contacting conditions for a period of time so as to produce a product stream comprising less carbon monoxide than said feed stream,
   wherein said composition is prepared by a method comprising the steps of:
   a) incorporating a hydrocarbon into the pores of an alumina-containing compound such that at least half of the pore volume of said alumina-containing compound contains said hydrocarbon;
   b) spraying a substance comprising platinum and iron into or onto said alumina-containing compound to form a sprayed support;
   c) contacting said sprayed support with a sulfide selected from the group consisting of hydrogen sulfide and an alkyl-sulfide to form a sulfided support;
   d) calcining said sulfided support to form a calcined support;
   e) contacting said calcined support with steam to form a steamed support; and
   f) reducing said steamed support to form said composition.

2. A process in accordance with claim 1 wherein at least a portion of the platinum of said composition is in a reduced valence state.

3. A process in accordance with claim 1 wherein prior to said oxidizing, said composition is reduced under reducing conditions which include a temperature in the range of from about 20° C. to about 650° C.

4. A process in accordance with claim 1, wherein prior to said oxidizing, said composition is reduced under reducing conditions, which include a temperature in the range of from 100° C. to 500° C.

5. A process in accordance with claim 1 wherein said contacting conditions include a temperature in the range of from about room temperature to about 100° C.

6. A process in accordance with claim 1 wherein said contacting conditions include a temperature in the range of from about 65° C. to about 90° C.

7. A process in accordance with claim 1 wherein said contacting conditions include a temperature in the range of 70° C. to 85° C.

* * * * *